Sept. 20, 1966  G. W. HODDY ETAL  3,273,948
BEARING STRUCTURE
Original Filed Aug. 7, 1958

INVENTOR.
GEORGE W. HODDY & GERALD L. HODDY &
BY RAYMOND A. HODDY

Barnes, Kisselle, Raisch & Choate
ATTORNEY

United States Patent Office 3,273,948
Patented Sept. 20, 1966

3,273,948
BEARING STRUCTURE
George W. Hoddy, Gerald L. Hoddy, and Raymond A. Hoddy, Owosso, Mich., assignors to Universal Electric Company, Owosso, Mich., a corporation of Michigan
Application May 24, 1962, Ser. No. 197,398, now Patent No. 3,223,464, dated Dec. 14, 1965, which is a division of application Ser. No. 753,695, Aug. 7, 1958, now Patent No. 3,063,761, dated Nov. 13, 1962. Divided and this application Feb. 4, 1965, Ser. No. 430,424
4 Claims. (Cl. 308—72)

This application is a divisional application of our copending application Serial No. 197,398, filed May 24, 1962, now Patent No. 3,223,464, issued Dec. 14, 1965 which in turn is a division of application Serial No. 753,-695, filed August 7, 1958, now Patent No. 3,063,761, issued Nov. 13, 1962.

This invention relates to improved bearing structures and pertains more specifically to a self-aligning bearing for a rotatably and power driven shaft.

Self-aligning bearings for shafts are not new but the present bearing has decided and wide advantages over such bearings as heretofore made, known and used. Heretofore it has been common practice to provide self-aligning bearings with a spherical shaped nose which is rotatably supported in a support or seat, but with such bearings it was necessary to provide pressure longitudinally of the bearing and the shaft which is rotatably therein to retain the bearing in its seat. The pressure has been ordinarily provided through the medium of resilient means. Such bearings have been found to be unsatisfactory as well as costly to make and assemble. When subjected to heavy or vibrating loads, such bearings pull out of or move in their seats and thereby cause noisy operation or damage. Additionally when only a small amount of power is transmitted to the shaft these bearings will not freely align due to the pressure utilized to hold the bearings on their seats and the shaft binds and is prevented from rotating.

An advantage of the present bearing is that it requires no force to retain it in position in its seat and this attribute is due to the fact that its support or seat is directly vertically beneath the self-aligning spherical or curved portion of the bearing, that is to say, perpendicular to the shaft. As a result of this, there is provided a freely self-aligning bearing and a support which do not require pressure between them to maintain them in proper operating position and a bearing which cannot be removed from its support or seat by load on the shaft.

The bearing has the advantage of embodying a resilient section or sections for shock absorption and these are expansible to maintain the self-aligning portion of the bearing in contact with its support or seat. This expansible feature of the bearing eliminates clearance between the bearing and its support or seat and additionally compensates for any dimensional variation which might exist between the bearing and its support or seat in that the bearing will be inherently, automatically or manually adjustable to provide variable outside spherical diameters.

While the present improved bearing inherently aligns itself prior bearings inherently misalign themselves with the shaft. Prior bearings are supported at one end in the bearing support and the center of gravity of the shaft load on the bearing is located at the longitudinal center of the bearing. This arrangement produces a leverage in the bearing which causes the bearing to swivel in its seat and thereby tighten the shaft which causes undesirable results.

The bearing has many other desirable attributes such as the following. It is rugged; it is usable with either reciprocating, rotating, oscillating or stationary shafts, and in all instances it is positively free to align itself and will therefore not bind the shaft; it will not break down oil film because the shaft will not cock and, as a consequence, prevent uneven wear of the shaft or the bearing; it provides the minimum of rotating friction to the shaft, and most importantly provides for more quiet operation than do bearings as heretofore known and used.

Basically, the bearing embodying the invention comprises an element having a spherical outer surface which engages a cylindrical support, the diameter of the spherical surface being substantially equal to the diameter of the cylindrical supporting surface. In accordance with the invention, the bearing embodies a resiliency externally of the spherical surface which permits the bearing to accommodate to dimensional variations. This is achieved by providing inherent resiliency in the support or interposing resilient means between a fixed support and the spherical contacting surface, said resilient means defining the cylindrical supporting surface.

Figures 1, 2:
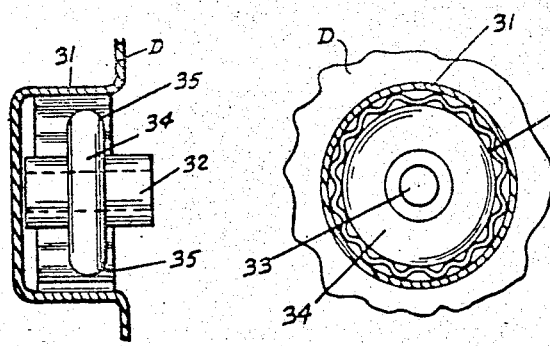
FIG. 1 is a view in side elevation and partly in vertical section illustrating a bearing embodying the invention.
FIG. 2 is an end view of the bearing of FIG. 1.

The bearing illustrated in FIGS. 1 and 2 is a construction utilizing the resilient principle, hereinbefore described, of engagement between the self-aligning portion of the bearing and the bearing seat. The motor case end D is provided with a cylindrical bearing support or seat 31. The bearing embodies a ring or sleeve 32 having a bore 33 for the reception of the shaft. Intermediate its length the sleeve is provided with a circular shaped enlargement 34 constituting the self-aligning portion of the bearing and the outer face or perimeter of this is spherical as at 35. Intermediate the surface 35 and the bearing seat or support a thin corrugated spring steel strip 36 is interposed. The outer face of this strip engages the bearing seat while the inner face of the strip engages the spherical surface 35.

Figure 3:
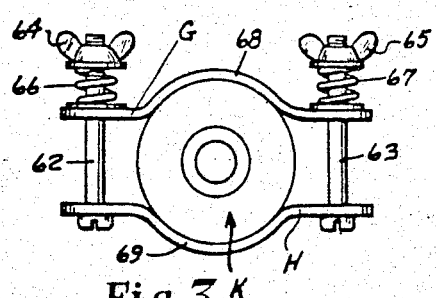
FIG. 3 is an end view of a still further form of bearing seat.

The structure of FIG. 3 is a two-part resilient support and comprises a pair of strap-like elements G and H the outer ends of which are connected by bolts 62 and 63 each of which is provided with a wing nut 64 and 65 for tightening down upon its respective coil spring 66 or 67 which encircle the extending ends of the bolts. The bearing, designated as an entirety by K, can be of any of several constructions described and is supported between the straps or saddles. Intermediate their lengths each strap is provided with a curved or spherical shaped portion as at 68 and 69 for the reception of the bearing.

Figure 4:
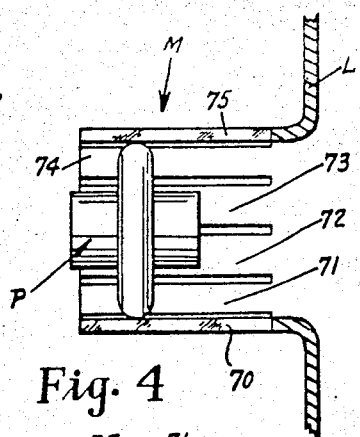
FIG. 4 is a view in side elevation partly in vertical section illustrating a still further form of bearing seat.
Figure 5:
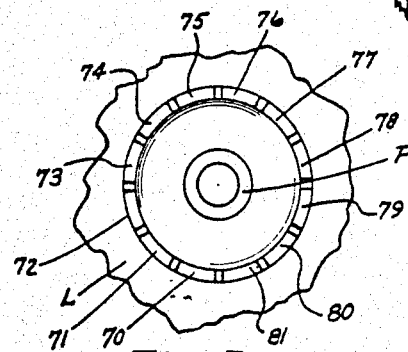
FIG. 5 is an end view of FIG. 4.

In the bearing support structure illustrated in FIGS. 4 and 5, L designates the support generally and this might well, but not necessarily, be one end of a motor casing. A plurality of spring fingers 70 to 81 inclusive extend axially outwardly from the support L to provide a circular tubular seat designated M. A bearing P is supported in the seat and this bearing can be of any of the types hereinbefore described. Specifically, bearing P comprises a ring or sleeve having a bore for the reception of a shaft. Intermediate its length the sleeve is provided with a circular-shaped enlargement constituting the self-aligning portion of the bearing in the outer face or perimeter of this enlargement is spherical.

Figures 6, 7:
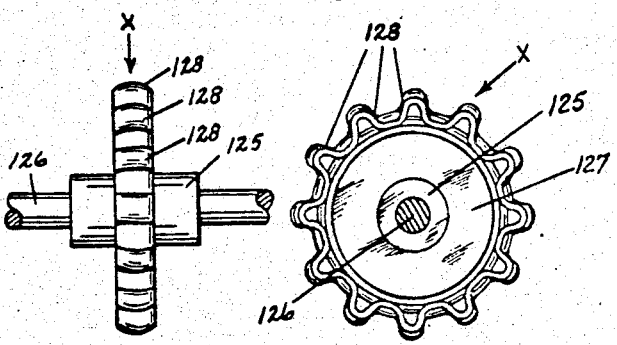
FIG. 6 is an end view of a modified form of bearing.
FIG. 7 is a view in side elevation of the bearing of FIG. 6.

A further form of bearing is illustrated in FIGS. 6 and 7. This bearing can be used with any of the supports illustrated in respect to the bearing heretofore described and comprises a sleeve 125 which rotatably supports the shaft 126. Intermediate its length the bearing is provided with a circular enlargement 127 the outer face of which is spherical. A strip of spring steel designated as an entirety by X is repeated around the face of the circular enlargement 127. This strip is of a corrugated nature comprising a plurality of transversely extending protrusions 128. These protrusions in end view, as they appear in FIG. 6, have a spherical or curved surface and additionally each of the protrusions is curved throughout its length, that is to say, curved in a direction transversely of the strip just as the perimeter of the enlargement 127 is curved transversely.

The protrusions have sufficient resiliency so that the bearing with the strip thereon will automatically adjust itself to any slight variations in size of the cylindrical support, as for instance a support 31 in FIG. 1. It will be understood that there could be some variations in the size of the seat or support resulting from error in the manufacture thereof. Accordingly, this bearing will resiliently adjust or accommodate itself to its seat or support and additionally the bearing is self-centering as the bearing will rock on the spherical surfaces of the protrusions which are in engagement with the seat or support. This self-centering operation would be similar to that described in respect to the bearing appearing in FIG. 1.

Figure 8:
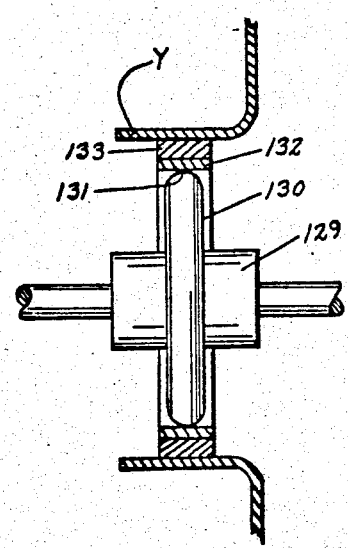
FIG. 8 is a view in side elevation partly in vertical section illustrating a still further modified form of bearing.

FIG. 8 is a further modified form of bearing shown in combination with a bearing support or seat Y. Here the bearing comprises a sleeve 129 having intermediate its length a circular enlargement 130 the perimeter of which is spherical as at 131. A flat metallic strip or band 132 encircles the perimeter of the circular enlargement 130. A resilient strip or band 133, which is also flat, encircles the band or strip 132. This construction provides the resiliency so that the bearing will accommodate itself to the interior diameter of the seat or support Y. The self-aligning attribute of the bearing is obtained through the spherical face 131 of the enlargement 130 which face readily rocks on the under face of the strip 132 as will be readily apparent and understood from the construction illustrated in FIG. 8.

All of the bearings, if desired, may be composed of some suitable finely pulverized metal having the desired porosity so that the metal may readily absorb lubricant to provide a self-lubricating bearing. The inventive concept is not limited to the use of any particular material in the bearings. The bearings may be made in whole or in part of bronze, babbitt or some other metal. The bearings may be made in part of a metal and in part of some other material such as nylon or plastic. Any material suitable to the particular use to which the bearing is to be put can be used and the material used will be dictated by the circumstances and the use to which the bearing is to be put.

We claim:
1. A self-aligning bearing structure for a shaft comprising
  a bearing member having a ring and a bore for the reception of a shaft,
  a motor housing or the like,
  said bearing member having an outer perimter which is transversely curved to define a substantially spherical contacting surface portion,
  said housing having a portion surrounding said spherical contacting surface portion,
  radially yieldable means interposed between said housing portion and said spherical contacting surface portion,
  said radially yieldable means circumscribing a generally cylindrical supporting surface,
  said spherical contacting surface portion having its center aligned substantially on the axis of the cylindrical supporting surface and having a diameter substantially equal to the diameter of said cylindrical supporting surface,
  said radially yieldable means having limited radial resiliency sufficient to accommodate dimensional variations but insufficient to permit any substantial movement of the center of the bearing member so that the center of the bearing member is maintained in position,
  said cylindrical supporting surface having a longitudinal extent sufficient to permit relatively unrestrained axial movement of said bearing member relative to said supporting surface.

2. The combination set forth in claim 1 wherein said radially yieldable means comprises a corrugated spring metal having circumferentially spaced protrusions thereon extending radially outwardly and inwardly, the radially innermost portions of the surfaces of said protrusions which extend radially inwardly circumscribing said generally cylindrical supporting surface.

3. The combination set forth in claim 1 wherein said radially yieldable means comprises a ring of resilient material interposed and compressed between said housing portion and said spherical contacting surface portion, and a ring of relatively incompressible material interposed between said ring of resilient material and said spherical contacting surface portion, said last mentioned ring having a cylindrical surface defining said cylindrical supporting surface.

4. A self-aligning bearing structure for a shaft comprising
  a bearing member having a ring and a bore for the reception of a shaft,
  a motor housing or the like,
  said bearing member having an outer perimeter which is transversely curved to define a substantially spherical contacting surface portion,
  said housing having a first part fixed thereto and a second part yieldingly mounted thereon,
  said parts circumscribing a generally cylindrical supporting surface,
  said spherical contacting surface portion having its center aligned substantially on the axis of the cylindrical supporting surface and having a diameter substantially equal to the diameter of said cylindrical supporting surface,
  said radially yieldable means having limited radial resiliency sufficient to accommodate dimensional variations but insufficient to permit any substantial movement of the center of the bearing member so that the center of the bearing member is maintained in position,
  said cylindrical supporting surface having a longitudinal extent sufficient to permit relatively unrestrained axial movement of said bearing member relative to said supporting surface.

References Cited by the Examiner
UNITED STATES PATENTS
742,178  10/1903  Fleming _____ 308—47

DAVID J. WILLIAMOWSKY, *Primary Examiner.*
FRANK SUSKO, *Examiner.*